United States Patent [19]

Katsuda

[11] Patent Number: 5,532,921
[45] Date of Patent: Jul. 2, 1996

[54] ELECTRIC CONTROL APPARATUS FOR SHOCK ABSORBER

[75] Inventor: Takayuki Katsuda, Toyota, Japan

[73] Assignee: Toyota Jidosha Kabushiki Kaisha, Toyota, Japan

[21] Appl. No.: 311,696

[22] Filed: Sep. 23, 1994

[30] Foreign Application Priority Data

Sep. 28, 1993 [JP] Japan .................. 5-242584

[51] Int. Cl.⁶ .................................... B60G 17/00
[52] U.S. Cl. ............... 364/424.05; 280/707; 180/299
[58] Field of Search ............... 364/424.05; 280/707, 280/840, 6.1, 6.11, 6.12; 180/41; 188/299, 281, 285, 319

[56] References Cited

U.S. PATENT DOCUMENTS

| | | | |
|---|---|---|---|
| 4,696,489 | 9/1987 | Fujishiro et al. | 280/707 |
| 4,936,425 | 6/1990 | Boone et al. | 364/424.05 |
| 5,004,079 | 4/1991 | Ivers et al. | 280/707 |
| 5,174,598 | 12/1992 | Sato et al. | 364/424.05 |
| 5,248,015 | 9/1993 | Yoshioka et al. | 188/299 |
| 5,322,320 | 6/1994 | Sahashi et al. | 280/707 |
| 5,324,069 | 6/1994 | Ogawa | 364/424.05 |
| 5,328,202 | 7/1994 | Kakizaki | 364/424.05 |

FOREIGN PATENT DOCUMENTS

| | | |
|---|---|---|
| 3-276806 | 12/1991 | Japan . |
| 3-276807 | 12/1991 | Japan . |
| 3-276808 | 12/1991 | Japan . |
| 3-276811 | 12/1991 | Japan . |

*Primary Examiner*—Kevin J. Teska
*Assistant Examiner*—Tan Q. Nguyen
*Attorney, Agent, or Firm*—Kenyon & Kenyon

[57] ABSTRACT

An electric control apparatus for a shock absorber disposed between unsprung mass and sprung mass of a suspension mechanism in an automotive vehicle and provided with an electrically operated control valve for changing damping characteristics of vertical displacement of the sprung mass relative to the unsprung mass, wherein absolute vertical displacement velocity of the sprung mass and relative vertical displacement velocity of the sprung mass to the unsprung mass are detected to determine a target opening degree of the control valve in accordance with the detected absolute vertical displacement velocity and relative vertical displacement velocity of the sprung mass, and where variation of the target opening degree is allowed in a large range only when the direction of the relative vertical displacement velocity has changed and is restricted in a predetermined small range under other conditions where the shock absorber acts to absorb vibration of the vehicle body.

4 Claims, 5 Drawing Sheets

ELECTRIC CONTROL APPARATUS FOR SHOCK ABSORBER

BACKGROUND OF THE INVENTION

1. Field of the Invention

The present invention relates to an electric control apparatus for a shock absorber disposed between unsprung mass and sprung mass of a suspension mechanism in an automotive vehicle and provided with an electrically operated control valve to be electrically controlled for changing damping characteristics of vertical displacement of the sprung mass relative to the unsprung mass.

2. Discussion of the Prior Art

Disclosed in Japanese Patent Laid-open Publication No. 3-276807 is a conventional electric control apparatus of this kind, wherein absolute vertical displacement velocity of the sprung mass and relative vertical displacement velocity of the sprung mass to the unsprung mass are detected to control the damping coefficient of the shock absorber on a basis of the skyhook theory proposed by D. Karnopp. In this control apparatus, an opening degree of the control valve is decreased in accordance with an increase of a difference between the absolute vertical displacement velocity and the relative vertical displacement velocity to increase the damping coefficient of the shock absorber and is increased in accordance with a decrease of the difference between the absolute vertical displacement velocity and the relative vertical displacement velocity to decrease the damping coefficient of the shock absorber.

In such control of the damping coefficient, however, the difference between the absolute vertical displacement velocity and the relative vertical displacement velocity changes from a positive value to a negative value or vice-versa if either the absolute vertical displacement velocity or the relative vertical displacement velocity changes in its sign from positive to negative or vice-versa. In such an instance, the opening degree of the control valve is greatly changed to cause sudden change of the damping coefficient of the shock absorber. In other words, when the relative vertical displacement velocity is maintained to be approximately zero, the damping force of the shock absorber is changed in a small range. In this instance, the passenger is not applied with any large shock. If the relative vertical displacement velocity is not maintained to be approximately zero, the damping force of the shock absorber changes in a large range. In this instance, the passenger is applied with a large shock.

SUMMARY OF THE INVENTION

It is, therefore, a primary object of the present invention to provide an electric control apparatus for a shock absorber capable of controlling the control valve in such a manner that the passenger is not applied with any large shock even when the damping characteristic of the shock absorber is switched over.

According to the present invention, the object is accomplished by providing an electric control apparatus for a shock absorber disposed between unsprung mass and sprung mass of a suspension mechanism in an automotive vehicle and provided with an electrically operated control valve to be electrically controlled for changing damping characteristics of vertical displacement of the sprung mass relative to the unsprung mass, which control apparatus comprises first detection means for detecting absolute vertical displacement velocity of the sprung mass; second detection means for detecting relative vertical displacement velocity of the sprung mass to the unsprung mass; determination means for determining a target opening degree of the control valve in accordance with the detected absolute vertical displacement velocity and relative vertical displacement velocity of the sprung mass; restriction means for allowing variation of the target opening degree in a large range only when the direction of the relative vertical displacement velocity has changed and for restricting the target opening degree in a predetermined small range under other conditions where the shock absorber acts to absorb vibration of the vehicle body; and control means for controlling an opening degree of the control valve to the target opening degree.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1A:
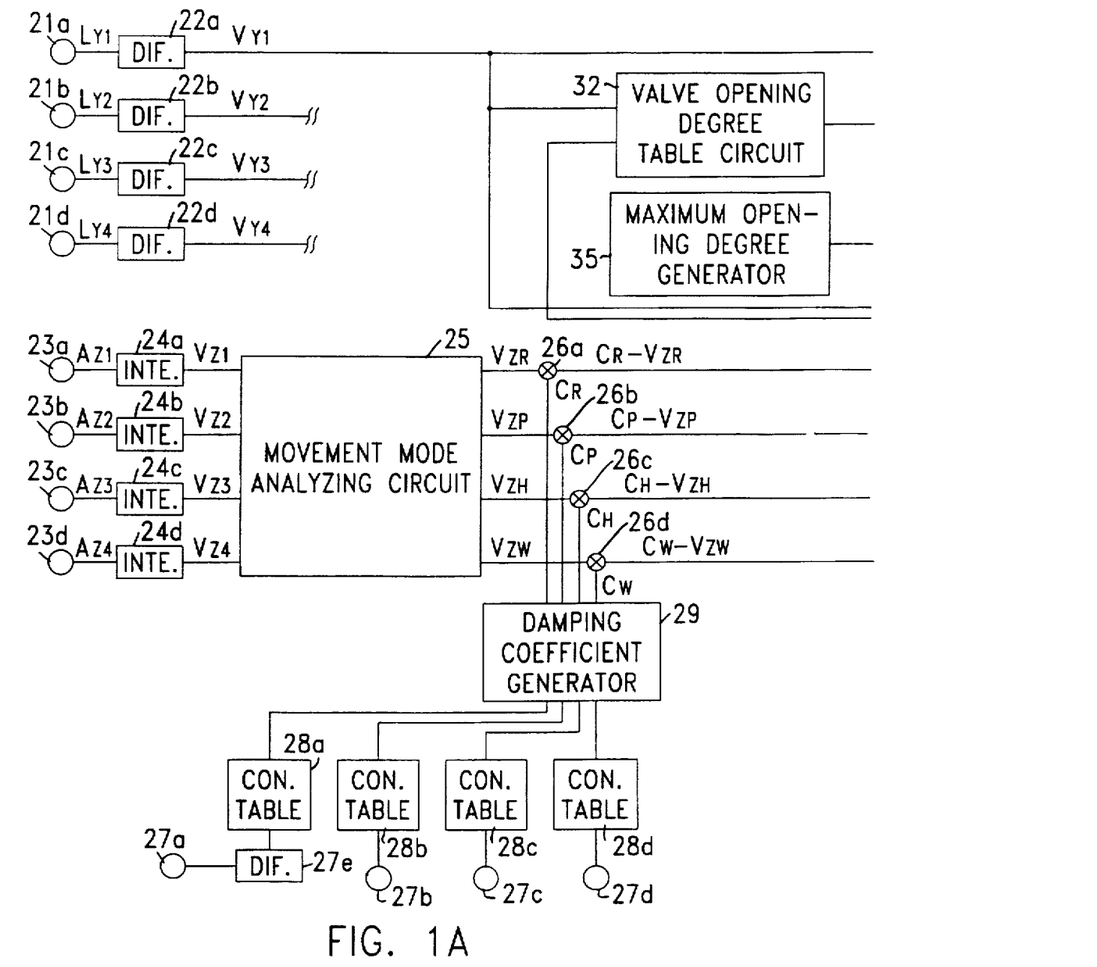
FIGS. 1A and 1B are a schematic block diagram of an electric control apparatus for shock absorbers in accordance with the present invention.
Figure 1B:
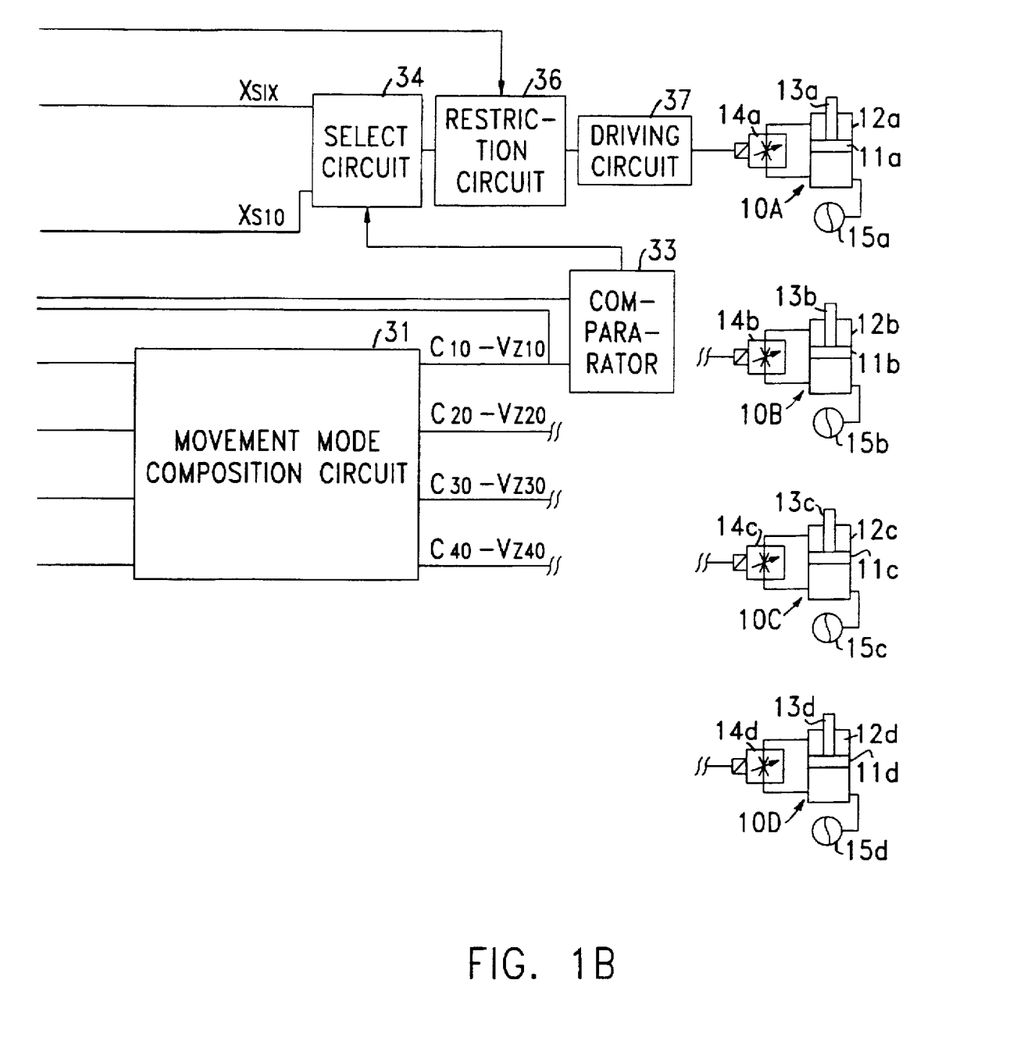
Figure 2A:
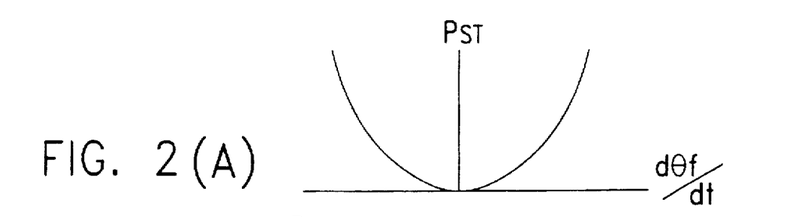
FIGS. 2(A) to 2(D) each illustrate a conversion characteristic of each conversion table shown in FIGS. 1A and 1B.
Figure 2B:
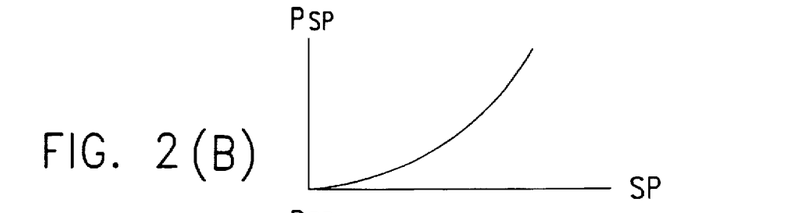
Figure 2C:
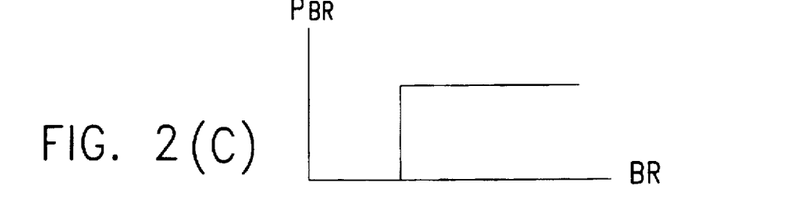
Figure 2D:
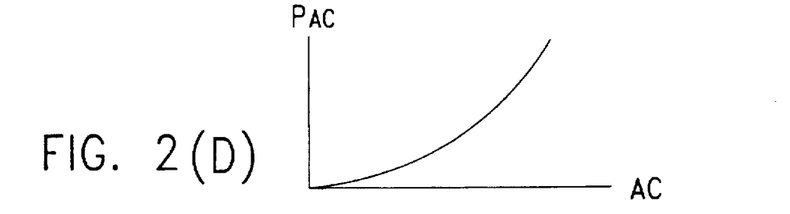

In FIGS. 1A and 1B of the drawings, there is schematically illustrated an electric control apparatus for shock absorbers 10A–10D which are disposed between unsprung mass in the form of a lower arm of a suspension mechanism (not shown) and sprung mass in the form of a vehicle body structure (not shown) at each position of left and right front road wheels and left and right rear road wheels. The shock absorbers 10A–10D include hydraulic cylinders 12a–12d each interior of which is subdivided into upper and lower chambers by means of pistons 11a–11d. The hydraulic cylinders 12a–12d are mounted on the unsprung mass, and the pistons 11a–11d are connected to each lower end of piston rods 13a–13d which are supported on the sprung mass at their upper ends. The upper and lower chambers of hydraulic cylinders 12a–12d are communicated with each other respectively through electromagnetic control valves 14a–14d, wherein the opening degree of each of the electromagnetic control valves 14a–14d can be adjusted to a plurality of values. The lower chambers of hydraulic cylinders 12a–12d are respectively connected to gas spring units 15a–15d which are constructed to absorb a volume change of the lower and upper chambers caused by vertical displacement of the piston rods 13a–13d.

The electric control apparatus includes relative displacement sensors 21a–21d respectively disposed between the sprung mass and unsprung mass at each road wheel to detect relative vertical displacement amounts $L_{Y1}$, $L_{Y2}$, $L_{Y3}$, $L_{Y4}$ of the sprung mass to the unsprung mass. Electric signals respectively indicative of the detected relative vertical displacement amounts $L_{Y1}$, $L_{Y2}$, $L_{Y3}$, $L_{Y4}$ are differentiated by differentiators 22a–22d and issued as electric signals indicative of relative vertical displacement velocities $V_{Y1}$, $V_{Y2}$, $V_{Y3}$, $V_{Y4}$ of the sprung mass to the unsprung mass. Increase of the relative vertical displacement velocities $V_{Y1}$, $V_{Y2}$, $V_{Y3}$, $V_{Y4}$ are represented by a positive value, while decrease of the relative vertical displacement velocities $V_{Y1}$, $V_{Y2}$, $V_{Y3}$, $V_{Y4}$ are represented by a negative value.

The electric control apparatus further includes vertical acceleration sensors 23a–23d mounted on the sprung mass at each road wheel to detect absolute vertical acceleration $A_{Z1}$, $A_{Z2}$, $A_{Z3}$, $A_{Z4}$ of the sprung mass. Electric signals indicative of the detected vertical acceleration $A_{Z1}$, $A_{Z2}$, $A_{Z3}$, $A_{Z4}$ are integrated by integrators 24a–24d and issued as electric signals indicative of the absolute vertical displacement velocity $V_{Z1}$, $V_{Z2}$, $V_{Z3}$, $V_{Z4}$ of the sprung mass. The absolute vertical displacement velocities $V_{Z1}$, $V_{Z2}$, $V_{Z3}$, $V_{Z4}$ of the sprung mass in an upward direction are represented by a positive value, while the absolute vertical displacement velocities $V_{Z1}$, $V_{Z2}$, $V_{Z3}$, $V_{Z4}$ of the sprung mass in a downward direction are represented by a negative value.

A movement mode analyzing circuit 25 is connected to the integrators 24a–24d to analyze the absolute vertical displacement velocities $V_{Z1}$, $V_{Z2}$, $V_{Z3}$, $V_{Z4}$ into roll velocity $V_{ZR}$ of the vehicle body, pitch velocity $V_{ZP}$, heave velocity $V_{ZH}$ (vertical displacement velocity of the vehicle body) and warp velocity $V_{ZW}$ (torsion velocity of the vehicle body in a fore-and-aft direction). In a practical embodiment, the analysis of the movement mode is realized by calculation of the following coordinate conversion formula.

$$\begin{pmatrix} V_{ZR} \\ V_{ZP} \\ V_{ZH} \\ V_{ZW} \end{pmatrix} = \begin{pmatrix} 1 & -1 & -1 & 1 \\ 1 & 1 & -1 & -1 \\ 1 & 1 & 1 & 1 \\ 1 & -1 & 1 & -1 \end{pmatrix} \begin{pmatrix} V_{Z1} \\ V_{Z2} \\ V_{Z3} \\ V_{Z4} \end{pmatrix} \quad (1)$$

Each output of the movement mode analyzing circuit 25 is connected to each first input of multiplexers 26a–26d which are connected at their second inputs to a steering angle sensor 27a, a vehicle speed sensor 27b, a brake sensor 27c, an accelerator sensor 27d, a differentiator 27e, conversion tables 28a–28d and a damping coefficient generator 29. The steering sensor 27a is mounted on a steering shaft of the vehicle (not shown) to detect a rotation angle of a steering wheel for producing an electric signal indicative of a steering angle θf corresponding with the detected rotation angle. The vehicle speed sensor 27b is arranged to detect rotation speed of an output shaft of a transmission of the vehicle as a vehicle speed SP for producing an electric signal indicative of the detected vehicle speed SP. The brake sensor 27c is arranged to detect a depression amount BR of a brake pedal (not shown) for producing an electric signal indicative of the detected depression amount BR. The accelerator sensor 27d is arranged to detect a depression amount AC of an accelerator pedal (not shown) for producing an electric signal indicative of the detected depression amount AC. The differentiator 27e is connected to the steering sensor 27a to differentiate the electric signal indicative of the steering angle θf for producing an electric signal indicative of a steering speed dθf/dt.

The conversion tables 28a–28d are applied with the electric signals respectively indicative of the steering speed dθf/dt, vehicle speed SP, depression amount BR of the brake pedal and depression amount AC of the accelerator pedal and convert the applied electric signals into electric signals respectively indicative of exponents $P_{ST}$, $P_{SP}$, $P_{BR}$, $P_{AC}$ which are changed as shown in FIGS. 2(A)–2(D). The damping coefficient generator 29 is applied with the electric signals indicative of the exponents $P_{ST}$, $P_{SP}$, $P_{BR}$, $P_{AC}$ and calculates the following equations to obtain Skyhook damping coefficients $C_R$, $C_P$, $C_H$, $C_W$ as target damping coefficients respectively corresponding with roll motion, pitch motion, heave motion and warp motion of the vehicle body.

$$C_R = P_{ST} \cdot P_{SP}$$
$$C_P = P_{BR} \cdot P_{AC} \quad (2)$$
$$C_H = P_{SP}$$
$$C_W = P_{ST} \cdot P_{SP} \cdot P_{BR} \cdot P_{AC}$$

The multiplexers 26a–26d are responsive to the electric signals from the movement mode analysis circuit 25 and damping coefficient generator 29 to multiply the target skyhook damping coefficients $C_R$, $C_P$, $C_H$, $C_W$ by the movement velocity $V_{ZR}$, $V_{ZP}$, $V_{ZH}$, $V_{ZW}$ at each motion of the vehicle roll, pitch, heave and warp. Thus, the multiplexers 26a–26d produce electric signals indicative of target damping forces $C_R \cdot V_{ZR}$, $C_P \cdot V_{ZP}$, $C_H \cdot V_{ZH}$, $C_W \cdot V_{ZW}$ and apply them to a movement mode composition circuit 31. The movement mode composition circuit 31 is responsive to the electric signals from the multiplexers 26a–26d to composite the target damping forces $C_R \cdot V_{ZR}$, $C_P \cdot V_{ZP}$, $C_H \cdot V_{ZH}$, $C_W \cdot V_{ZW}$ with the corresponding vertical damping forces $C_{10} \cdot V_{Z10}$, $C_{20} \cdot V_{Z20}$, $C_{30} \cdot V_{Z30}$, $C_{40} \cdot V_{Z40}$ of the sprung mass. Practically, the composition of the movement mode is realized by calculation of the following coordinate conversion formula.

$$\begin{pmatrix} C_{10} & V_{Z10} \\ C_{20} & V_{Z20} \\ C_{30} & V_{Z30} \\ C_{40} & V_{Z40} \end{pmatrix} = \begin{pmatrix} 1 & 1 & 1 & 1 \\ -1 & 1 & 1 & -1 \\ -1 & -1 & 1 & 1 \\ 1 & -1 & 1 & -1 \end{pmatrix} \begin{pmatrix} C_R & V_{ZR} \\ C_P & V_{ZP} \\ C_H & V_{ZH} \\ C_W & V_{ZW} \end{pmatrix} \quad (3)$$

In the formula (3), the coefficients $C_{10}$, $C_{20}$, $C_{30}$, $C_{40}$ correspond with skyhook damping coefficients against vertical movement of the sprung mass at each road wheel, and the characters $V_{Z10}$, $V_{Z20}$, $V_{Z30}$, $V_{Z40}$ correspond with the absolute vertical displacement velocity $V_{Z1}$, $V_{Z2}$, $V_{Z3}$, $V_{Z4}$ of the sprung mass.

The movement mode analyzing circuit 25 and the movement mode composition circuit 31 have been adapted for the following reason. The shock absorbers 10A–10D act to control a damping force against vertical movement of the sprung mass relative to the unsprung mass at each road wheel, while the passenger feels each motion of the vehicle roll, pitch, heave and warp. It is, therefore, desirable that the vertical movement of the vehicle body is controlled in consideration with the skyhook damping coefficients $C_R$, $C_P$, $C_H$, $C_W$ which are defined in accordance with driving conditions of the vehicle such as the steering speed dθf/dt, vehicle speed SP, depression amount BR of the brake pedal and depression amount AC of the accelerator pedal.

Figure 3:
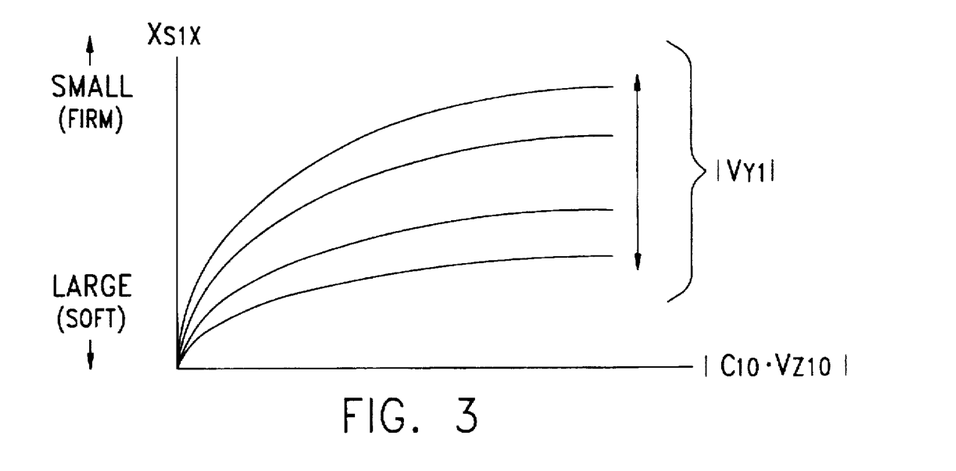
FIG. 3 is a graph showing a conversion characteristic of a conversion table in a valve opening degree table circuit shown in FIGS. 1A and 1B.

The electric control apparatus further includes a valve opening degree table circuit 32 and a comparator 33 which are provided to correspond with the respective shock absorbers 10A–10D. In the Figures, there are illustrated only the valve opening degree table circuit 32 and comparator 33 for the shock absorber 10A. The valve opening degree table circuit 32 and comparator 33 are applied with the electric signals indicative of the relative vertical displacement velocities $V_{y1}$, $V_{y2}$, $V_{y3}$, $V_{y4}$ from the differentiators 22a–22d and the electric signals indicative of the vertical damping forces $C_{10} V_{Z10}$, $C_{20} V_{Z20}$, $C_{30} V_{Z30}$, $C_{40} V_{Z40}$ of the sprung mass from the movement mode composition circuit 31. In this instance, the electric signals indicative of the vertical damping forces $C_{10} \cdot V_{Z10}$, $C_{20} \cdot V_{Z20}$, $C_{30} \cdot V_{Z30}$, $C_{40} \cdot V_{Z40}$ of the sprung mass represent each value of the absolute vertical displacement velocity $V_{Z1}$, $V_{Z2}$, $V_{Z3}$, $V_{Z4}$ compensated by the coefficients $C_{10}$, $C_{20}$, $C_{30}$, $C_{40}$. The valve opening degree table circuit 32 includes a calculator and a characteristic table shown in FIG. 3, which is designed to produce an electric signal indicative of a valve opening degree $X_{SIX}$ corresponding with the relative vertical displacement velocity $V_{y1}$ and damping coefficient $C_{10} V_{Z10}$. The valve opening degree $X_{SIX}$ is increased in accordance with a decrease of the relative vertical displacement velocity $V_{y1}$ and is also increased in accordance with an increase of the absolute vertical displacement velocity $V_{Z10}$ or an increase of the coefficients $C_{10}$, $C_{20}$, $C_{30}$, $C_{40}$.

A select circuit 34 is connected to the valve opening degree table circuit 32 to be applied with the electric signal indicative of the valve opening degree therefrom and is connected to a maximum valve opening degree generator 35 to be applied with an electric signal indicative of a maximum opening degree $X_{S10}$ therefrom. The comparator 33 is arranged to compare the relative vertical displacement velocity $V_{y1}$ with the damping force $C_{10} \cdot V_{Z10}$ for issuing a high level signal therefrom when the sign of the relative vertical displacement velocity $V_{y1}$ coincides with the sign of the damping force $C_{10}$ and for issuing a low level signal therefrom when the sign of the relative vertical displacement velocity $V_{y1}$ does not coincide with the sign of the damping force $C_{10} \cdot V_{Z10}$. Thus, the select circuit 34 acts to issue the electric signal indicative of the valve opening degree $X_{SIX}$ as an electric signal indicative of a target opening degree $X_{S1}$ in response to the high level signal from the comparator 33 and to issue an electric signal indicative of the maximum valve opening degree $X_{S10}$ as the electric signal indicative of the target opening degree $X_{S1}$ in response to the low level signal from the comparator 33.

In this embodiment, means for determining the target opening degree $X_{S1}$ of the electromagnetic control valve 14a is composed of the valve opening degree table circuit 32, comparator 33, select circuit 34 and maximum opening degree generator 35. The target opening degree $X_{S1}$ is determined in such a manner as described above for the following reason. In a condition where the shock absorber 10A is being shrunk due to a projection on the travel road during upward displacement of the sprung mass, the damping force $C_{10} V_{Z10}$ becomes positive while the relative vertical displacement velocity $V_{y1}$ becomes negative. In a condition where the shock absorber 10A is extended due to a hollow spot on the travel road during downward movement of the unsprung mass, the damping force $C_{10} \cdot V_{Z10}$ becomes negative while the relative vertical displacement velocity $V_{y1}$ becomes positive. Under these conditions, the shock absorber 10A does not act to absorb vibration of the vehicle body. Thus, the opening degree of the electromagnetic control valve 14a is maximized under the above conditions to render the shock absorber 10A in a soft condition and is controlled in accordance with the relative vertical displacement velocity $V_{y1}$ and damping force $C_{10} \cdot V_{Z10}$ under other conditions where the shock absorber 10A acts to absorb vibration of the vehicle body.

The electric signal indicative of the target opening degree $X_{S1}$ is applied to a restriction circuit 36 which includes a microcomputer arranged to be applied with the electric signal indicative of the relative vertical displacement velocity $V_{y1}$ from the differentiator 22a. The microcomputer of restriction circuit 36 is programmed to repeat execution of a control program shown by a flow chart in FIG. 4 for allowing variation of the target opening degree $X_{S1}$ in a larger range only when the direction of the relative vertical displacement velocity $V_{y1}$ has changed and for restricting variation of the target opening degree $X_{S1}$ in a predetermined small range under other conditions where the shock absorbers 10A–10d act to absorb vibration of the vehicle body. The restriction circuit 36 is connected to a driving circuit 37 which is provided to drivingly control the electromagnetic control valve 14a in accordance with an electric signal indicative of a target opening degree $X_{S1}(n)$ restricted at the restriction circuit 36 for setting the opening degree of control valve 14a to the restricted target opening degree $X_{S1}(n)$.

In operation of the electric control apparatus, relative vertical displacement velocities $V_{y1}$, $V_{y2}$, $V_{y3}$, $V_{y4}$ of the sprung mass to the unsprung mass at each road wheel are detected by the relative displacement sensor 21a–21d and differentiators 22a–22d to apply electric signals indicative of the relative vertical displacement velocities $V_{y1}$, $V_{y2}$, $V_{y3}$, $V_{y4}$ to the valve opening degree table circuit 32, comparator 33 and restriction circuit 36. On the other hand, absolute vertical displacement velocities $V_{Z1}$, $V_{Z2}$, $V_{Z3}$, $V_{Z4}$ of the sprung mass at each road wheel are detected by the acceleration sensor 23a–23d and integrators 24a–24d and analyzed by the movement mode analyzing circuit 25 into roll velocity $V_{ZR}$, pitch velocity $V_{ZP}$, heave velocity $V_{ZH}$ and warp velocity $V_{ZW}$ of the sprung mass. Thus, electric signals indicative of the analyzed velocities $V_{ZR}$, $V_{ZP}$, $V_{ZH}$, $V_{ZW}$ are applied to the multiplexers 26a–26d. Simultaneously, a steering speed dθf/dt, a vehicle speed SP, a depression amount BR of the brake pedal and a depression amount AC of the accelerator pedal are detected by the sensors 27a, 27b, 27c, 27d and differentiator 27e and converted by the conversion tables 28a–28d into electric signals indicative of exponents $P_{ST}$, $P_{SP}$, $P_{BR}$, $P_{AC}$ shown in FIGS. 2(A)–2(D). When applied with the electric signals indicative of the exponents $P_{ST}$, $P_{SP}$, $P_{BR}$, $P_{AC}$, the damping coefficient generator 29 calculates the equations (2) to obtain skyhook damping coefficients $C_R$, $C_P$, $C_H$, $C_W$ for optimal control of roll motion, pitch motion, heave motion and warp motion of the vehicle body and applies electric signals indicative of the skyhook damping coefficients $C_R$, $C_P$, $C_H$, $C_W$ to multipliers 26a–26d. At the multipliers 26a–26d, the skyhook damping coefficients $C_R$, $C_P$, $C_H$, $C_W$ are respectively multiplied by the roll velocity $V_{ZR}$, pitch velocity $V_{ZP}$, heave velocity $V_{ZH}$ and warp velocity $V_{ZW}$ to obtain target damping forces $C_R \cdot V_{ZR}$, $C_P \cdot V_{ZP}$, $C_H \cdot V_{ZH}$, $C_W \cdot V_{ZW}$ with respect to the roll motion, pitch motion, heave motion and warp motion of the vehicle body. Thus, the target damping forces $C_R \cdot V_{ZR}$, $C_P \cdot V_{ZP}$, $C_H \cdot V_{ZH}$, $C_W \cdot V_{ZW}$ are converted by the movement mode composition circuit 31 into target damping forces $C_{10} \cdot V_{Z10}$, $C_{20} \cdot V_{Z20}$, $C_{30} \cdot V_{Z30}$, $C_{40} \cdot V_{Z40}$ with respect to the absolute vertical movement of the sprung mass at each road wheel to apply electric signals indicative of the target damping forces $C_{10} \cdot V_{Z10}$, $C_{20} \cdot V_{Z20}$, $C_{30} \cdot V_{Z30}$, $C_{40} \cdot V_{Z40}$ to the valve opening degree table circuit 32 and comparators 33.

Figure 5A:
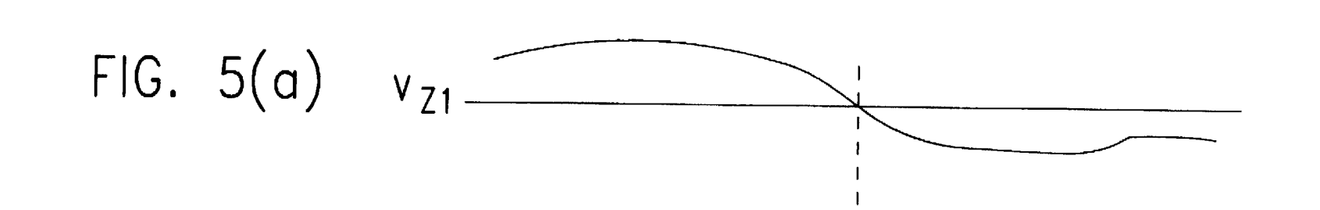
FIGS. 5(a) to 5(d) each are a time chart respectively showing variation of absolute vertical displacement velocity of sprung mass, relative vertical displacement velocity of the sprung mass to unsprung mass, a target opening degree and an instant target opening degree.
Figures 5B, 5C:
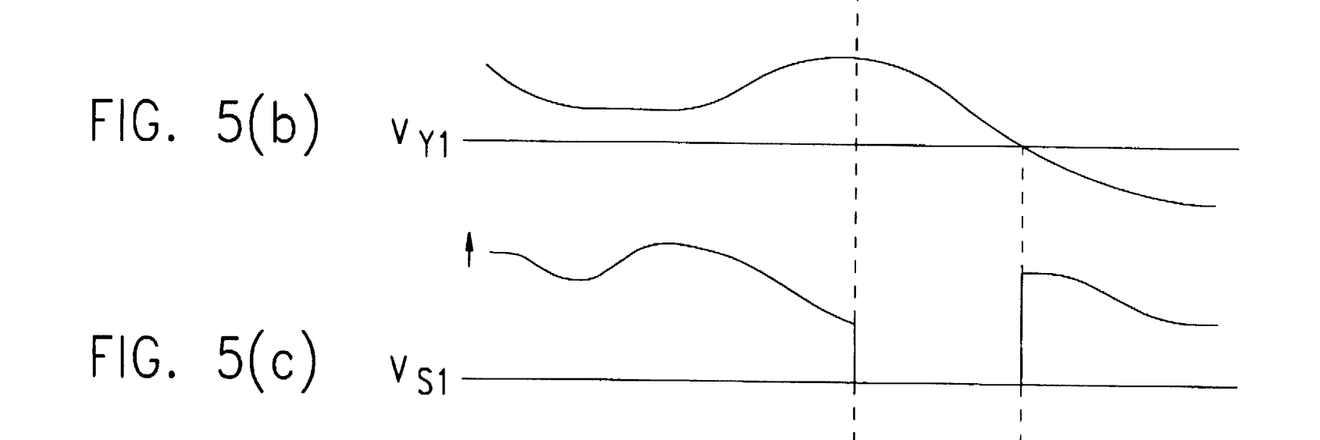
Figure 5D:
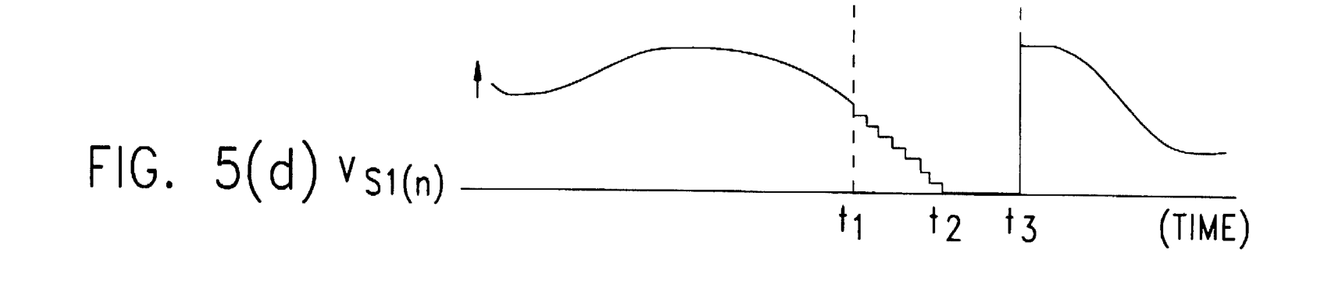

When each sign of the target damping forces $C_{10} \cdot V_{Z10}$, $C_{20} \cdot V_{Z20}$, $C_{30} \cdot V_{Z30}$, $C_{40} \cdot V_{Z40}$ coincides with each sign of the relative vertical displacement velocity $V_{y1}$, $V_{y2}$, $V_{y3}$, $V_{y4}$, a target opening degree $X_{SIX}$ of the control valve is determined in accordance with the relative vertical displacement velocities $V_{y1}$, $V_{y2}$, $V_{y3}$, $V_{y4}$ and the target damping forces $C_{10} \cdot V_{Z10}$, $C_{20} \cdot V_{Z20}$, $C_{30} \cdot V_{Z30}$, $C_{40} \cdot V_{Z40}$ at the valve opening degree table circuit 32, comparator 33, select circuit 34 and maximum valve opening degree generator 35. (see FIG. 3) When each sign of the target damping forces $C_{10} \cdot V_{Z10}$, $C_{20} \cdot V_{Z20}$, $C_{30} \cdot V_{Z30}$, $C_{40} \cdot V_{Z40}$ does not coincide with each sign of the relative vertical displacement velocities $V_{y1}$, $V_{y2}$, $V_{y3}$, $V_{y4}$, the maximum opening degree $X_{S10}$ is determined as the target opening degree $X_{S1X}$ of control valve 14a. Assuming that the absolute vertical displacement velocity $V_{z1}$ of the sprung mass and the relative vertical displacement velocity $V_{y1}$ of the sprung mass to the unsprung mass has changed as shown in FIGS. 5(a) and 5(b), the target opening degree $X_{S1}$ of damper valve 14a is changed as shown in FIG. 5(c). Thus, electric signals respectively indicative of the target opening degree $X_{S1}$ and the relative vertical displacement velocity $V_{y1}$ are applied to the restriction circuit 36.

Figure 4:
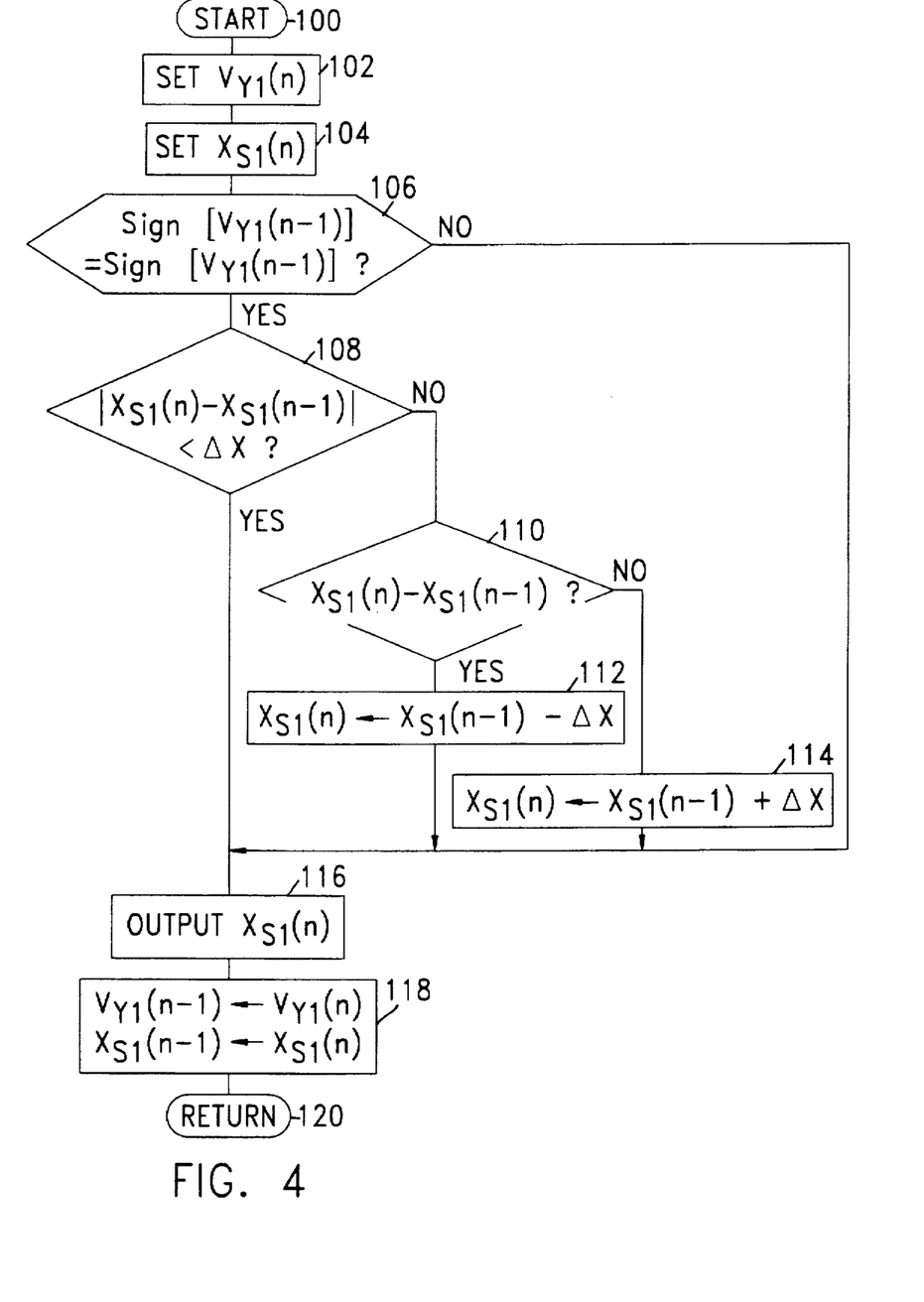
FIG. 4 is a flow chart of a control program executed by a microcomputer of a restriction circuit shown in FIGS. 1A and 1B.

At the restriction circuit 36, the microcomputer repeats execution of the control program shown by the flow chart in FIG. 4. After initiated execution of the control program at step 100, the computer is applied with electric signals indicative of the relative vertical displacement velocity $V_{y1}$ and target opening degree $X_{S1}$ at step 102 and 104 and sets the relative vertical displacement velocity $V_{y1}$ and target opening degree $X_{S1}$ as instant relative vertical displacement velocity $V_{y1}(n)$ and instant target opening degree $X_{S1}(n)$. At the following step 106, the computer compares the sign [$V_{y1}(n)$] of the instant relative vertical displacement velocity $V_{y1}(n)$ with the sign [$V_{y1}(n-1)$] of a previous relative vertical displacement velocity $V_{y1}(n-1)$ previously set at step 118. If the relative vertical displacement velocity $V_{y1}(n)$ is maintained in a positive value until a time $t_3$ as shown in FIG. 5(b), the computer determines a "Yes" answer at step 106 and causes the program to proceed to steps 108–114.

During processing at steps 108–114, variation of the target opening degree $X_{S1}$ is restricted within a predetermined small value $\Delta X$ (for instance, a value corresponding with one step of the opening degree of control valve 14a) as described below. If an absolute value $|X_{S1}(n)-X_{S1}(n-1)|$ of a difference between the instant target opening degree $X_{S1}(n)$ and the previous target opening degree $X_{S1}(n-1)$ is less than the predetermined small value $\Delta X$, the computer determines a "Yes" answer at step 108 and produces at step 116 an electric signal indicative of the instant target opening degree $X_{S1}(n)$. If the absolute value $|X_{S1}(n)-X_{S1}(n-1)|$ is more than the predetermined small value $\Delta X$, the computer determines a "No" answer at step 108 and changes the instant target opening degree $X_{S1}(n)$ by processing at steps 110–114 as follows. If the instant target opening degree $X_{S1}(n)$ tends to be decreased, the computer determines a "Yes" answer at step 110 and causes the program to proceed to step 112 where the instant target opening degree $X_{S1}(n)$ is changed to a small value $X_{S1}(n-1)-\Delta X$ less than the previous target opening degree $X_{S1}(n-1)$. If the target opening degree $X_{S1}(n)$ tends to be increased, the computer determines a "No" answer at step 110 and causes the program to proceed to step 114 where the instant target opening degree $X_{S1}(n)$ is changed to a larger value $X_{S1}(n-1)+\Delta X$ than the previous target opening degree $X_{S1}(n-1)$.

Thus, when the target opening degree $X_{S1}$ changes in a small range until a time $t_1$ shown in FIG. 5(c), the instant target opening degree $X_{S1}(n)$ is determined to be equal to the target opening degree $X_{S1}$. When the target opening degree $X_{S1}$ changes in a large range at the time $t_1$ shown in FIG. 5(c), the instant target opening degree $X_{S1}(n)$ is changed by the predetermined value $\Delta X$ at plural steps. Assuming that the relative vertical displacement velocity $V_{y1}$ changes from positive to negative at the time $t_3$ shown in FIG. 5(b), the computer determines a "No" answer at step 106 and causes the program to proceed to step 116. In this instance, the instant target opening degree $X_{S1}(n)$ greatly changes in accordance with an increase of the target opening degree $X_{S1}$. At step 116, the computer produces an electric signal indicative of the instant target opening degree $X_{S1}(n)$ and applies it to the driving circuit 37. When applied with the electric signal, the driving circuit 37 sets the opening degree of control valve 14a to the instant target opening degree $X_{S1}(n)$. As a result, the damping force of shock absorber 10A is controlled at plural steps in accordance with the instant target opening degree $X_{S1}(n)$. After processing at step 116, the computer renews at step 118 the previous relative vertical displacement velocity $V_{y1}(n-1)$ and the previous target opening degree $X_{S1}(n-1)$ with the instant relative vertical displacement velocity $V_{y1}(n)$ and target opening degree $X_{S1}(n)$ for the following execution of the control program.

As is understood from the above description, great change of the damping force of the shock absorbers 10A–10D is permitted only when the direction of relative vertical displacement velocity $V_{y1}-V_{y4}$ of the sprung mass to the unsprung mass has changed. Under the other conditions, variation of the damping force of the shock absorbers 10A–10D is restricted within the predetermined small value $\Delta X$. Thus, shocks to the passenger can be restrained in a minimum value without causing any loss of damping effects by the shock absorbers 10A–10D based on the skyhook theory.

Although in the above embodiment, the differentiators 22a–22d, 27e, integrators 24a–24d, movement mode analyzing circuit 25, multiplexers 26a–26d, damping coefficient generator 29, movement mode composition circuit 31, valve opening degree table circuit 32, comparator 33, select circuit 34 and maximum valve opening degree generator 35 have been constructed in the form of a hard circuit, either or all the circuits may be replaced with a control program processed by a microcomputer. Alternatively, the processing of the control program may be carried out by means of a hard circuit.

What is claimed is:

1. An electric control apparatus for a shock absorber disposed between an unsprung mass and a sprung mass of a suspension mechanism in an automotive vehicle, the shock absorber being provided with an electrically operated control valve an opening degree of which may be electrically controlled for changing damping characteristics of the shock absorber to control vertical displacement of the sprung mass relative to the unsprung mass, comprising:

first detection means for detecting a velocity of the sprung mass relative to a road surface on which the automotive vehicle is supported;

second detection means for detecting a velocity of the sprung mass relative to the unsprung mass;

determination means for determining a target opening degree of the control valve in accordance with the detected velocity of the sprung mass relative to the road surface and the velocity of the sprung mass relative to the unsprung mass;

restriction means for controlling the determination means so that the target opening degree is varied within a first predetermined range when the second detection means has detected a direction change condition in the velocity of the sprung mass relative to the unsprung mass and for restricting variation of the target opening degree to a second predetermined range when the second detection means has not detected a direction change condition in the velocity of the sprung mass relative to the unsprung mass, the second predetermined range being smaller than the first predetermined range; and control means for controlling an opening degree of the control valve so that the opening degree of the control valve approaches the target opening degree.

2. An electric control apparatus for a shock absorber as claimed in claim 1, further comprising means for defining a target damping coefficient corresponding to the damping of movement of the sprung mass relative to the road surface, wherein the target damping coefficient is determined in accordance with driving conditions of the vehicle, the control apparatus further comprising means for determining a target damping force in accordance with the velocity detected by the first detection means and the target damping coefficient, wherein said determination means determines a target opening degree of said control valve in accordance with the velocity detected by the second detection means and the target damping force.

3. An electric control apparatus for a shock absorber as claimed in claim 2, further comprising means for generating a signal indicative of a maximum valve opening degree of the control valve, and comparison means for comparing the velocity detected by the second detection means with the target damping force for issuing a first signal when a sign of the velocity detected by the second detection means coincides with a sign of the target damping force and for issuing a second signal when the sign of the velocity detected by the second detection means does not coincide with the sign of the target damping force, the control apparatus further comprising selection means for transmitting a signal indicative of the target opening degree to said restriction means in response to the first signal from said comparison means and for transmitting a signal indicative of the maximum valve opening degree to said restriction means in response to the second signal from said comparison means.

4. An electric control apparatus for a shock absorber disposed between an unsprung mass and a sprung mass of a suspension mechanism in an automotive vehicle, the shock absorber being provided with an electrically operated control valve, an opening degree of which is electrically controlled for changing damping characteristics of the shock absorber to control vertical displacement of the sprung mass relative to the unsprung mass, wherein:

a velocity of the sprung mass relative to a road surface, on which the automotive vehicle is supported, and a velocity of the sprung mass relative to the unsprung mass are detected and transmitted to a determination means that determines a target opening degree of the control valve in accordance with the detected velocity of the sprung mass relative to the road surface and the velocity of the sprung mass relative to the unsprung mass, and the electric control apparatus comprises restriction means for controlling the determination means so that the target opening degree is allowed to vary without restriction when the shock absorber does not act to absorb vibration of the vehicle body and for controlling the determination means so that variation of the target opening degree is restricted to a predetermined range when the shock absorber acts to absorb vibration of the vehicle body.

* * * * *